United States Patent

[11] 3,624,374

[72] Inventor Louis Kent Steiner
Minneapolis, Minn.

[21] Appl. No. 90,503
[22] Filed Nov. 18, 1970
[45] Patented Nov. 30, 1971
[73] Assignee Control Data Corporation
South Minneapolis, Minn.

[54] BINARY TO BINARY CODED DECIMAL CONVERTER
7 Claims, 4 Drawing Figs.

[52] U.S. Cl. .......... 235/155, 340/347 DD
[51] Int. Cl. .......... H04l 3/00
[50] Field of Search .......... 235/155; 340/347

[56] References Cited

UNITED STATES PATENTS

| | | | |
|---|---|---|---|
| 3,509,328 | 4/1970 | Arnstein | 235/155 |
| 3,564,225 | 2/1971 | Watson, Jr. | 235/155 |
| 3,524,976 | 8/1970 | Wang | 235/155 |

*Primary Examiner*—Maynard R. Wilbur
*Assistant Examiner*—Jeremiah Glassman
*Attorneys*—Joseph A. Genovese and Paul L. Sjoquist

ABSTRACT: A binary-to-binary-coded-decimal (BCD) converter wherein the binary number is held in a first register and is shifted bit by bit into a second register as the number is converted. A plurality of logic circuits connected to the second register examine four-bit segments of the second register and control an adder which increments the number when the binary values of the examined four-bit segments are equal to predetermined quantities.

INVENTOR.
LOUIS KENT STEINER
BY Paul L. Sjoquist
Joseph A. Genovese
ATTORNEYS

INVENTOR.
LOUIS KENT STEINER
BY Paul L. Sjoquist
Joseph A. Genovese
ATTORNEYS

BINARY TO BINARY CODED DECIMAL CONVERTER

BACKGROUND OF THE INVENTION

1. Field of the Invention

This invention relates to a binary-to-binary-coded-decimal converter used mainly in the computer art. More specifically it relates to an electrical digital calculator for converting data from one number system (binary) to another number system (BCD).

2. Description of the Prior Art

Previously, if it were desired to convert a number in the binary number system to one in the binary-coded-decimal system, predetermined separate BCD values for each binary bit were held in storage. This could have been core memory or some other type of storage device like a magnetic tape, drum, disc, etc. These BCD values correspond to decimal values of $2^N$ with each separate value being equal to one possible binary digit to be converted. The exponent N would equal 0, 1,...up to the number of binary bits to be converted. Thus, if the binary numbers to be converted had 48 bits, 48 separate BCD values would be stored with one value corresponding to each binary bit value.

The binary bits equal to one were sensed and their corresponding stored BCD values were then transferred to a decimal adder. This was done one BCD value at a time. The decimal adder would initially add zero (0000) to the first BCD value transferred from storage to form a first partial sum. This first partial sum would be held in a holding register and then sent to the adder at the same time the next BCD value was transferred from storage. A second partial sum would be formed by the result which sum would be added to the next unused BCD value from storage. When all binary bits equal to one had their corresponding BCD values sensed and added to the then existing partial sum the conversion was complete. This final answer would usually appear in some type of register or be transmitted to core memory for future use. It should be apparent that the order in which BCD values were added made no difference as long as each value was only used once.

In my invention it is not necessary to use valuable storage space to hold the BCD values corresponding to each binary bit. Instead, logic circuits are used to check predetermined four-bit groups of the binary number to be converted and to determine if an add operation is to occur. The BCD value is built up bit by bit in a holding register until all binary bits have been used. Thus, my invention avoids the problem of determining BCD values initially and then storing those values as was required in the prior art. Further, it utilizes a binary parallel adder in place of the decimal adder. In many cases a few iterations through the adder are required.

SUMMARY

This invention is embodied in a binary-to-binary-coded-decimal converter having a first register which holds the binary number to be converted. Initially, the leftmost four-bit segment of the number is shifted to a second register. Thereafter, the leftmost bit is shifted one bit at a time from the first to second register. In the second register bits are grouped into predetermined four-bit groups. Each group is sensed by a separate logic circuit to determine whether it meets a certain criterion. If the criterion is met, the number in the second register is increased by passing it through a parallel binary adder at the same time a predetermined value is sent to the adder. The sum of the addition is sent to the second register where it is left shifted one position. The leftmost bit held in the first register is shifted into the vacated position. This procedure of shifting, sensing in the logic circuits, adding if necessary, and shifting again, is repeated until all bits have been shifted out of the first register and the final result appears in the second register or is transmitted to memory.

The primary object of this invention is an improved binary-to-binary-coded-decimal converter.

An additional object is an improved converter that utilizes two registers, a binary adder, and logic circuitry.

A still further object is such a converter that does not require the allocation of storage space to hold possible BCD values for each binary bit.

Further objects will become apparent upon a reading of the specification and claims.

DESCRIPTION OF THE PREFERRED EMBODIMENT

Figure 1:
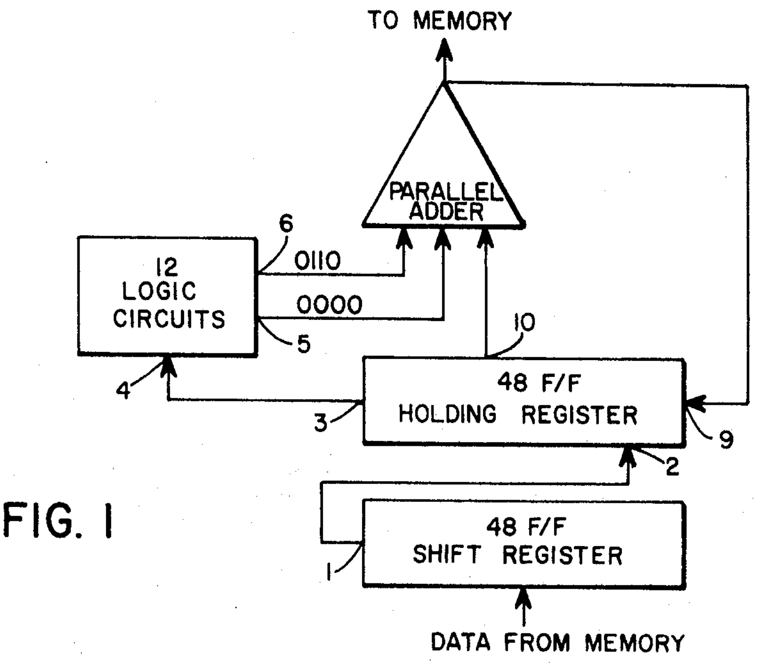
FIG. 1 is a block diagram of one embodiment of this invention.

In the binary number system binary digits (more commonly referred to as bits) are either one or zero. The position of the ones and zeros determines the value to be attached to the binary number. Starting from what may be considered a decimal point and reading from right to left the more bits with a leftmost one indicates a higher value. To convert from a binary to decimal number the particular decimal value may be determined by looking at the bits which are equal to one and noting the number of digit positions left. Exponents to the base two are assigned to the bits equal to one beginning with the zero exponent. A zero exponent is assigned to the rightmost bit position. The bit positions being equal to one are then converted to powers of two and added to arrive at the decimal value. For example, to arrive at the decimal value of 0101 exponents are assigned to the base two. This gives $2^2+2^0$, as the first one bit in the rightmost position has a zero power and the next one (measuring from the right to left) has an exponent of two. The decimal value of $2^2+2^0$ would be 4+1 or 5. Note that bits equal to zero have their exponents counted but do not contribute to the decimal value, i.e., the second position from the right has an exponent of one $2^1$) which is not used in arriving at value as it has a zero coefficient i.e. $0(2^1)$.

The binary-coded-decimal (BCD) format employed in this invention is that wherein four bits are used to represent one and only one decimal digit. The largest decimal digit that can therefore be represented in BCD format by four bits is nine (in BCD 1001). Likewise, zero in decimal would be 0000 in BCD. To express a decimal number having two or more digits four bits must be used for each digit. For example 53 in decimal would be 0101 0011 in BCD with 0101 being equal to decimal digit five and 0011 being equal to decimal digit three.

To appreciate this invention it is necessary to understand the relationship between binary and BCD numbers. The representations of the decimal digits zero to nine is exactly the same in binary as well as in BCD. The difference between the two number systems is first noticed when a two-digit decimal number is to be shown. Each decimal digit must be represented by four BCD bits whereas four binary bits may represent the two-digit decimal numbers 10 to 15. The largest decimal number four binary bits (1111) can represent is 15. The largest four BCD bits (1001) can represent is nine. The number 15 in BCD would be 0001 0101 wherein the left four bits (0001) represent one decimal and the right four (0101) represent five decimal. It is thus apparent that four-bit positions in binary may assume a decimal value which is six greater than four BCD bits.

In converting from the binary to BCD number systems the four most significant binary bits are first examined separately from the remainder of the binary number. These bits (reading from left to right) will be represented by the corresponding letters $D_4$, $D_3$, $D_2$ and $D_1$ in that order. The letter C stands for the bit in the position to the left of the leftmost bit $D_4$. These four bits are then checked in the logic expression $C+D_4(D_3+D)=1$ to see if they satisfy it. Note that this expression would read if D, OR $D_4$ AND $D_3$ OR $D_4$ and $D_2$ equals one it is satisfied. Initially, C would equal zero. $D_4$ would correspond to the leftmost bit, and $D_2$ the next. The bit $D_1$ is unused in the expression but would correspond to the rightmost bit of the four-bit binary number being converted. One will note that $D_1$ is not used in the logic expression as its value cannot change the add decision. The logic symbol + reads OR and the logic parenthesis () reads AND. If the expression checks out to be satisfied to read one, a binary six (0110) is added to the binary number being converted. If the expression checks out to read zero, either a binary zero (0000) may be added or the four binary bits to be converted may be passed to a register unchanged. The next step after the examination of the four bits to determine if a binary six is to be added, is to left shift the binary number being considered one bit place and place in the vacated bit space the leftmost unused bit from the remainder of the binary number. As before, this new four-bit group is checked by the expression $C+D_4(D_3+D_2)=1$ with the new bits inserted. If satisfied, a binary six is added, if not, the four-bit binary number retains its original value. This same procedure of examining, determining, adding or not, left shifting and tacking on a bit of the unused binary number is repeated until all of the digits of the binary number are converted to their BCD equivalent value.

Before giving an example of an actual conversion and the hardware to implement that conversion, it must be emphasized that a binary-to-BCD conversion is not the same or inverse of a BCD-to-binary conversion. To convert from BCD to binary is a more simple operation accomplished by first multiplying the leftmost significant four bits of the BCD by 10. This could be done in several ways, as for example, by left shifting the BCD number three positions to give the eight multiple and then left shifting the original four-bit number one position to get the two multiple. The two and eight multiples could be passed through an adder to give the 10 multiple. The next leftmost significant four unused bits of the BCD number are then added to the 10 multiple to give a first partial sum. This partial sum is multiplied by 10 as in the first step and the next unused four bits of the BCD are added to give a second partial sum. This procedure or algorithm is repeated until all BCD bits have been used. The last multiplication by 10, however, is not done once all BCD bits are added in the partial summing process.

The hardware illustrated in FIG. 1 may convert from binary to BCD. To illustrate how this is done consider the simple example where it is desired to convert binary 1111 (decimal 15) to its BCD equivalent. The binary number is initially held in memory. This memory may be the core memory of the central processor or the memory of a magnetic disc, magnetic tape, magnetic drum, etc., the exact type being unimportant. A control pulse from the control section of the central processor places the binary number in the shift register according to the conversion instruction. At the next control pulse the four bits (in this example the entire number 1111) are shifted to the holding register. Both registers have zeros represented in all of their flip-flops (i.e., they are cleared) prior to receiving the four bits. Next, four bits are checked out in the logic circuit and also the binary number being converted (1111) is sent to the adder. The four bits being considered by the logic circuit are 0111 where the 0 is the C term, the 1 to the right of 0 is the $D_4$ term of the expression, the second right 1 is the $D_3$ term, and the rightmost 1 is the $D_2$ term.

Figure 2:
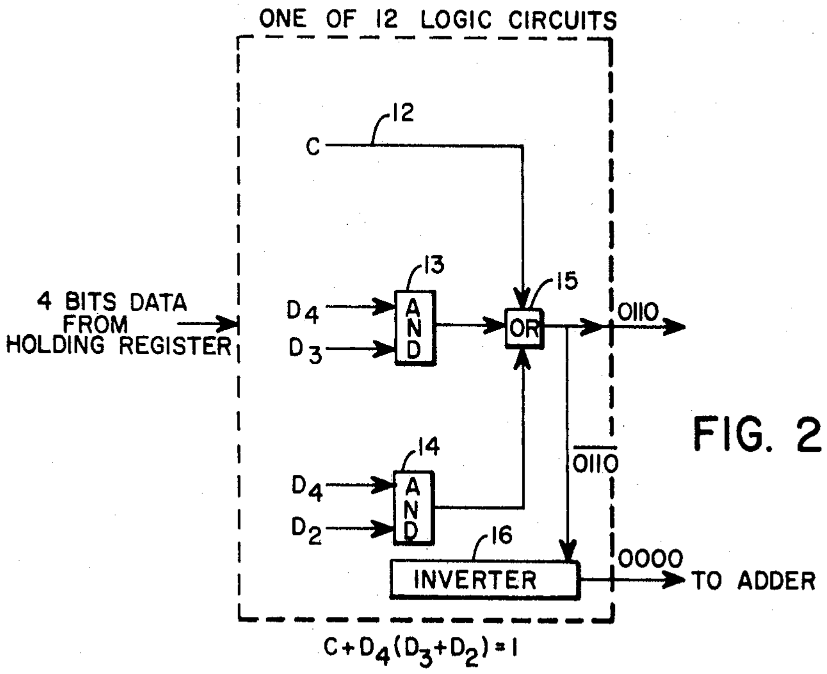
FIG. 2 shows the details of one of the logic circuits used in FIG. 1.

FIG. 2 illustrates one of the type of logic circuits which would consider the four bits (0111) to determine whether they satisfy the logic expression $C+D_4(D_3+D_2)=1$ . The number of logic circuits used would depend on the number of binary bits converted. The number of circuits would at least be equal to the largest whole number when the total number of binary bits is divided by four as four bits are sensed by each circuit. If the number of bits was 46 the number of circuits would be 12 as four goes into 46 11 times and the two remaining bits would require an additional circuit. As shown there are two AND-gates (13 and 14) with an input 12 for the C term. Inputs $D_4$ and $D_3$ go to gate 13 and inputs $D_4$ and $D_2$ go to gate 14. The inverter 16 sends out a signal (0000) if a binary six is not sensed by the OR-gate 15. Upon sensing the bits 0111 no signal would be inputted at input 12 but both gates 13 and 14 would be made resulting in the making of OR-gate 15 and the sending of a signal of a binary six to the adder. The binary adder of FIG. 1 then adds the binary six (0110) and the binary number (1111) sent from the holding register. This gives 0001 0101 or the BCD equivalent of decimal 15. As no further steps are involved in this simple conversion the BCD number may then be sent directly to memory.

In the usual case the binary number being converted is larger than 1111. Such a conversion would probably also involve consideration of repeated iterations through the adder and the loop 7 to 9 of FIG. 1. For instance, in one embodiment of my invention the holding registers and shift registers of FIG. 1 each have 48 flip-flops (F/F) which represent data bits. Initially, as before, the data comes from memory when a control pulse is received by the instruction to convert from binary to BCD. The 48 bits representing the binary number to be converted are next placed in the shift register. When another control pulse is received the leftmost four significant bits of the binary number are shifted to the holding register from the shift register. The remaining 44 bits of the binary number remain in the shift register. As before, the leftmost three of the four bits and a zero prefix representing the C term are sensed by one of the logic circuits to be checked in the logic expression $C+D_4(D_3+D)=1$ . A binary six or zero is added and the result from the adder outputs at point 7 and is put back in the holding register at point 9. This intermediate partial BCD number may at this stage be four or eight bits in length. The holding register then left shifts one space. The next step is for the shift register to transfer the leftmost unused bit of the remainder of the binary number to vacated fifth or ninth position, as the case may be of the BCD number held in the holding register. If this BCD were five-bits long at this time three zeros would be positioned to the left of the five bits to make two groups of four bits each. Each four-bit group would be sent to a separate logic circuit as shown in FIG. 2. The number of logic circuits employed would depend on the number of bits in the binary number to be converted. When a four eight-bit binary is used 12 logic circuits would be employed i.e., one logic circuit for each four bits.

After the first iteration which sent four bits to the holding register from the shift register, one bit is added to or tacked on to the contents of the holding register for each iteration. Every four-bit group in the holding register is shifted left once before a tack on from the shift register is made and then its contents are checked by its separate logic circuit as in FIG. 2, and the parallel binary adder would either add six or zero to each four-bit binary group whose corresponding four bits transmitted to the logic circuits resulted in a satisfy. In other words, the holding register sequence after the first check calls for a grouping into groups ($D_4$, $D_3$, $D_2$, $D_1$) of four and a sending of each group to the adder, a sensing of another group (C, $D_4$, $D_3$, $D_2$) of four bits by the logic circuit, an add if necessary, a left shift, and a placement of one bit from the remainder of the binary number to be converted in the vacated position. As the number of iterations increase the answer would be building up in the holding register and the number of logic circuits checking on four-bit groups would increase. In our 48 bit operand 45 iterations would be required before the final answer appears in the holding register. Once determined this BCD number could be passed unchanged through the adder at point 7 to memory or to some operator observable register, readout, etc.

Figure 3:
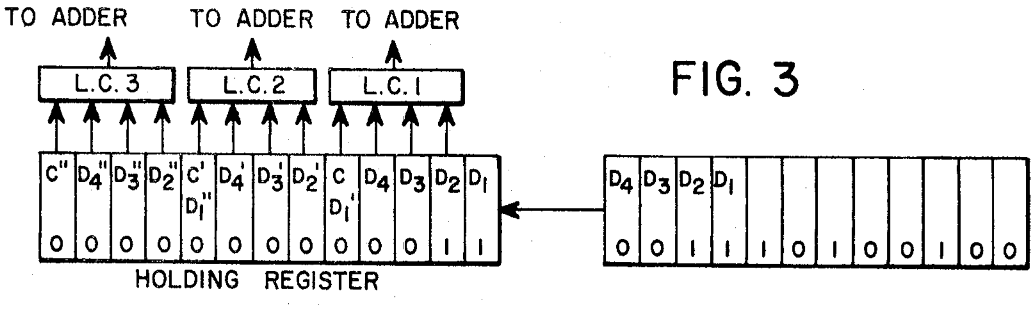
FIG. 3 shows the arrangement of the data, registers, and logic circuits to do a particular conversion.
Figure 4:
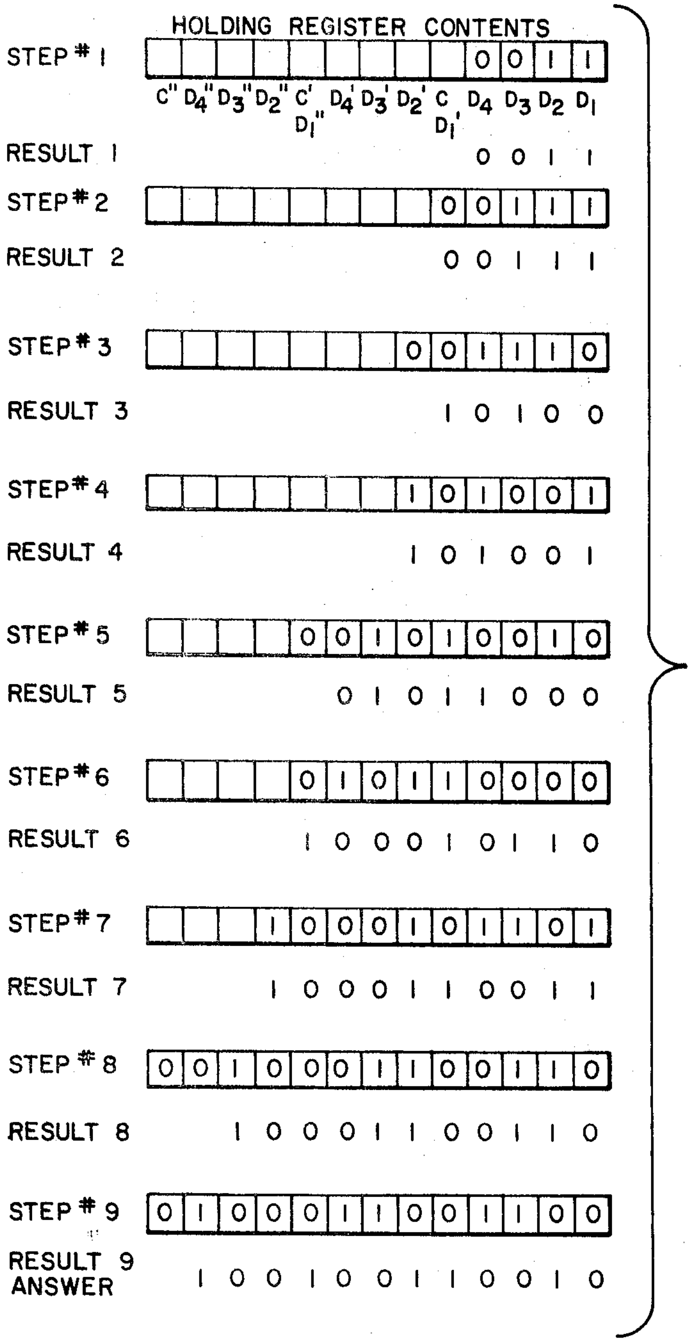
FIG. 4 is a step-by-step illustration of the conversion of the binary number held in the shift register in FIG. 3.

The example described by FIGS. 3 and 4 will suffice to explain away possible ambiguity. In this example it is desired to convert binary 932 (0011 1010 0100) to its BCD equivalent. FIG. 3 shows how the binary number would initially appear in the shift register. The first step would be to place the left four most significant bits (0011) in the holding register. This is shown in FIG. 3 where the bits occupy positions $D_1$, $D_2$, $D_3$ and $D_4$ of the holding register, in STEP No. 1 of FIG. 4, and also at (a) in the following chart. The bits occupying C, $D_4$, $D_3$, $D_2$ of the predetermined positions in the holding register are next checked out by the logic expression and it is determined not to add binary six (0110) thereto. This is result 1 shown in FIG. 4. This number is transmitted from point 7 to 9 of FIG. 1 and placed in the holding register. It is then left shifted one position and the leftmost unused bit (1) from the shift register is tacked on to it in the vacated position. This (00111) is shown as STEP No.2 of FIG. 4 and (b) of the chart. The four bits 0011 do not satisfy the logic equation so they remain unchanged (Result 2 of FIG. 4). After a left shift and a tack on of one bit (0) from the shift register the holding register has what is shown in STEP No. 3 of FIG. 4 (c) of the chart). The leftmost four bits (0111) do satisfy the equation so a binary six is added to the contents of the holding register. Result 3 of FIG. 4 and (d) of the chart show the sum (10100). The next left shift of the holding register and the tacking on of a new bit (1) gives 101001 (STEP No. 4, FIG. 4). An additional check in the logic expression results in no add being made (result 4, FIG. 4) and after a left shift and tack on of a bit (0) the holding register has 1010010 (STEP No.5, FIG. 4 and (e) of chart). The two groups of four bits 0010 and 1001 are each sensed by their logic circuits (L.C. 1 and L.C. 2 of FIG. 3). The group 1001 indicates an add is in order for its group. The sum is shown as result 5 of FIG. 4 and (f) in the chart. Still another left shift is made and also a tack on of one bit (0) to arrive at the holding register content of STEP No.6 in FIG. 4. By sensing the two four-bit groups 0101 and 1000 that correspond to positions $C'$, $D_4'$, $D_3'$, $D_2'$, and $C$, $D_4$, $D_3$, $D_2$, respectively, the logic circuit L.C. 2 and L.C. 1 indicate an add is in order for both groups. After both adds result 6 of FIG. 4 and (g) of the chart is what is the sum. A left shift and tack on of a bit (1) make the holding register have the contents shown as STEP No. 7 of FIG. 4. The groups ( $C$, $D_4$, $D_3$, $D_2$ and $C'$, $D_4'$, $D_3'$, $D_2'$) to be sensed by the logic circuits L.C. 1 and L.C. 2 are 0110 and 0001. Only the group 0110 requires an add. The addition gives result 7 of FIG. 4 and (h) of the chart. The left shift and tack on of a zero bit gives STEP No. 8 of FIG. 4. It is now necessary to have three group ($C''$ to $D_2''$, $C'$ to $D_2'$ and $C$ to $D_2$) sensed by their logic circuits L.C. 3, L.C. 2 and L.C. 1 of FIG. 3. None of these groups 0010, 0011, and 0011 results in an add (result 8 of FIG. 4). The left shift and tack on (0) gives the holding register display of STEP No. 9. The check of groups 0110, 0110 and 0100 require the additon of a binary six to the two 0110 groups. The sum is shown as (i) in the chart and result 9 in FIG. 4. This is the final answer as no more bits remain in the shifting register to be tacked on. Hence 1001 in BCD is nine decimal, 0011 is three decimal, and 0010 is two decimal to give 932.

CHART OF CONVERSION OF BINARY 932 (011 1010 0100) TO BCD 932

| | | |
|---|---|---|
| (a) | 0011 | Does $C+D_4(D_3+D_2)=1$?, No. |
| (b) | 0 0111 | Checked in equation. Add? No. |
| (c) | 0 1110 | Checked. Add? Yes. |
| | 0110 | Add binary six. |
| (d) | 1 0100 | Sum. |
| | 10 1001 | Left shift, Tack On. |
| (e) | 0 0101 0010 | Check Add? No. Left Shift, Tack On. |
| | 0110 | Check, Add? Yes. |
| (f) | 0 0101 1000 | Sum. |
| | 0 1011 0000 | Left Shift. Tack On. |
| | 0110 0110 | Check. Add? Yes, Add six. |
| (g) | 1 0001 0110 | Sum. |
| | 10 0010 1101 | Left Shift, Tack On. |
| | 10 0010 1101 | Check. Add? Yes. |
| | 0110 | Add six. |
| (h) | 10 0011 0011 | Sum. |
| | 100 0110 0110 | Left Shift. Tack On. |
| | 0100 0110 0110 | Check. Add? No. |
| | 0 1000 1100 1100 | Left Shift. Tack On. |
| | 1000 1100 1100 | Check. Add? Yes. |
| | 0110 0110 | Add six. |
| (i) | 1001 0011 0010 | Answer in BCD. |
| | (9) (3) (2) | |

To convert from a BCD number to a binary number the same hardware illustrated in FIG. 1 may be used. Consider the example, as in the binary-to-BCD conversion, where the BCD number corresponding to decimal 932 is to be converted. This BCD value would be 1001 0011 0010. This data would initially be held in some type of memory device and then on a control pulse from the control section placed in the shift register. The four most significant bits (1001) would be sent to the holding register and multiplied by 10. This could be done by obtaining the eight multiple with three left shifts (1001000) and the multiple with one left shift (10010) and then passing both multiples through the adder to get 1011010. The next step of the algorithm calls for the adding of the four next most significant bits of the BCD number to be converted (0011) to 10 multiple obtained. This would give 101 1101. Now this result is multiplied by 10 as before to give 1110 1000 10. This last step would be to pass the rightmost four-bit group of the BCD (0010) through the adder and add it to the last 10 multiple obtained to get the answer. This would be 1110 1001 00 or the binary equivalent. It is apparent that this procedure of multiplying by 10 and adding is usable because of the properties of the BCD number system. In other words, as we go from right to left in BCD each four-bit group would be some number times the 10 power (932 would be $9 \times 10^2$ plus $3 \times 10^1$ plus $2 \times 10^0$). By adding these multiples of 10 we obtain the desired answer (900+30 +2).

The BCD-to-binary conversion utilized only the registers with their shifting process and the adder. It does not utilize the logic circuits of FIG. 2. Further, the number of iterations required to do a binary-to-BCD conversion would be more. For instance, a 48-bit number would require 45 iterations in a binary-to-BCD conversion whereas the reverse of a BCD to binary would require 11 iterations.

The importance of such conversions as outlined herein is immediately apparent. Many of the modern day computers utilize a binary number system internally in their central processor to do add, divide, subtract, multiply, square root, or any of the multitude of execution operations required. Binary numbers, however, while excellent for the internal workings of computers, are difficult for an operator to interpret when reading a register at some readout station. Usually, therefore, the binary numbers are converted to another type of radix, like octal or hexidecimal. By my invention they could be converted to BCD which because of its easy visual conversion to the familiar decimal radix system makes reading easier and more accurate.

The algorithms set forth in this invention are not limited to the specific number of bits illustrated. The number of bits in the binary number to be converted can be easily changed by expanding or decreasing the modules of the registers, adders, and logic circuits used. It will further be understood that the above description of this invention is susceptible to various modifications, changes, and alterations. Such variations are intended to be encompassed within the meaning and range of equivalents of the appended claims:

I claim:

1. An electronic converter for converting a binary number to a binary-coded-decimal number comprising:

a. first storing means for storing and shifting a binary number received from memory;

b. second storing means connected to said first storing means for storing and shifting the binary bits as they are converted to binary-coded decimal;

c. logic circuit means connected to predetermined four-bit storing segments of said second storing means for sensing and determining if the binary representation of decimal six is to be added to four other binary bits held in said second storing means, said logic circuit means making its determination to add if the leftmost bit position sensed of the storing segment is a binary one or if the next to leftmost bit position sensed is a binary one and either of the other two bit positions sensed of the segment are binary ones; and d. adding means for adding the binary representation of decimal six to each four-bit binary group whose predetermined four-bit segment caused said logic circuit means to sense a determination to add whereby the binary number is shifted bit by bit from the first storing means to be second storing means with each predetermined four-bit segment sensed by the logic circuit means and a binary representation of decimal six added if necessary until all of the binary bits have been converted to their binary-coded-decimal equivalent.

2. The apparatus of claim 1 wherein said first and second storing means for storing and shifting the binary bits comprise digital registers.

3. The apparatus of claim 1 wherein said logic circuit means comprises at least two data receiving AND gates and one OR gate with the outputs of the AND gates connected to the input of the OR gate.

4. The apparatus of claim 1 wherein said means for adding the binary six to the group of four bits comprises a parallel binary adder.

5. The apparatus of claim 1 wherein said logic circuit means consists of a plurality of logic circuits with each circuit comprising at least two data receiving AND gates and one OR gate with the outputs of the AND gates connected to the input of the OR gate.

6. The apparatus of claim 5 wherein the number of logic circuits is at least equal to the largest whole number which is one fourth the total number of binary bits to be converted to binary-coded decimal.

7. The apparatus of claim 1 wherein:

a. said first and second storing means for storing and shifting the binary bits comprise digital registers;
b. said logic circuit means comprises a plurality of logic circuits equal to approximately one-fourth the total number of binary bits to be converted with each circuit having three data receiving inputs at least two of which are AND gates and an OR gate connected to the three inputs; and
c. said means for adding a binary six comprising a parallel binary adder connected to said OR gates whereby a signal sensed will result in the adding of a binary six to the contents of the groups of four bits with the sum sent to the second storing means for storing and shifting.

* * * * *